United States Patent
Melcher

(10) Patent No.: US 7,802,800 B2
(45) Date of Patent: Sep. 28, 2010

(54) MOTOR VEHICLE WITH LEANING SYSTEM CONTROLLED BY LOAD SENSOR AND METHOD THEREFOR

(76) Inventor: Thomas W. Melcher, 1239 W. Esplanade, Mesa, AZ (US) 85201

(*) Notice: Subject to any disclaimer, the term of this patent is extended or adjusted under 35 U.S.C. 154(b) by 601 days.

(21) Appl. No.: 11/738,249

(22) Filed: Apr. 20, 2007

(65) Prior Publication Data

US 2007/0246903 A1 Oct. 25, 2007

Related U.S. Application Data

(60) Provisional application No. 60/794,055, filed on Apr. 20, 2006.

(51) Int. Cl.
*B60G 17/016* (2006.01)
(52) U.S. Cl. .............. 280/5.509; 180/41; 180/282; 180/908; 280/5.51; 280/124.103
(58) Field of Classification Search ............. 180/312, 180/908, 41, 210, 282; 280/5.507, 5.509, 280/5.51, 5.513, 93.5, 124.103, 124.104, 280/124.105, 124.135, 124.136, 124.145, 280/124.157, 124.16, 124.161
See application file for complete search history.

(56) References Cited

U.S. PATENT DOCUMENTS

| | | | | |
|---|---|---|---|---|
| 2,152,938 | A * | 4/1939 | Welch | 280/124.103 |
| 2,206,970 | A * | 7/1940 | Megow | 280/124.103 |
| 2,907,578 | A * | 10/1959 | Taber | 280/5.508 |
| 3,567,243 | A * | 3/1971 | Ruhlin | 280/86.757 |
| 3,711,113 | A * | 1/1973 | Stammreich | 280/5.51 |
| 3,751,061 | A * | 8/1973 | Scheuerpflug | 280/86.751 |
| 4,546,997 | A | 10/1985 | Smyers | |
| 4,826,206 | A | 5/1989 | Immega | |
| 4,927,169 | A | 5/1990 | Scaduto | |
| 5,286,052 | A * | 2/1994 | Lukianov | 280/124.134 |
| 5,324,056 | A | 6/1994 | Orton | |
| 5,346,241 | A * | 9/1994 | Lee | 280/124.142 |
| 5,372,377 | A * | 12/1994 | Lee | 280/124.143 |
| 5,435,193 | A | 7/1995 | Halliday | |
| 5,435,591 | A * | 7/1995 | Lee | 280/124.139 |

(Continued)

FOREIGN PATENT DOCUMENTS

DE 10007658 A1 10/2001

(Continued)

*Primary Examiner*—Ruth Ilan
*Assistant Examiner*—Laura Freedman
(74) *Attorney, Agent, or Firm*—Robert D. Atkins

(57) ABSTRACT

A vehicle with lean control has a frame with a steering assembly. An arm assembly is connected to the frame. A pair of first and second shock absorbers is mounted between the frame and the arm assembly on opposite sides of the frame. Each shock absorber has a fluid-filled chamber and floating piston. A load sensor is mounted to the steering assembly for detecting changes of pressure on the steering assembly. The load sensor has a housing, a pressure sensing area disposed in the housing, and provides an electrical signal in response to the pressure sensing area. The load sensor detects pressure applied to the top plate of the housing. An electronic control unit is coupled to the electrical contact of the load sensor. A motor and pump assembly is responsive to the electronic control unit for transferring fluid between the chambers of the first and second shock absorbers.

7 Claims, 6 Drawing Sheets

U.S. PATENT DOCUMENTS

| | | | |
|---|---|---|---|
| 5,498,020 A * | 3/1996 | Lee | 280/124.142 |
| 5,580,089 A | 12/1996 | Kolka | |
| 5,620,199 A * | 4/1997 | Lee | 280/5.521 |
| 5,700,025 A * | 12/1997 | Lee | 280/86.751 |
| 5,782,484 A * | 7/1998 | Kuhn, Jr. | 280/124.142 |
| 6,039,337 A * | 3/2000 | Urbach | 280/124.134 |
| 6,170,838 B1 * | 1/2001 | Laurent et al. | 280/5.508 |
| 6,182,979 B1 * | 2/2001 | Lee | 280/5.507 |
| 6,250,649 B1 * | 6/2001 | Braun | 280/5.506 |
| 6,267,387 B1 | 7/2001 | Weiss | |
| 6,279,920 B1 | 8/2001 | Choudery | |
| 6,386,553 B2 * | 5/2002 | Zetterstrom | 280/5.51 |
| 6,406,036 B1 | 6/2002 | Laurent et al. | |
| 6,805,362 B1 * | 10/2004 | Melcher | 280/5.52 |
| 7,131,650 B2 | 11/2006 | Melcher | |
| 7,234,708 B2 * | 6/2007 | Blondelet et al. | 280/5.521 |
| 7,343,997 B1 * | 3/2008 | Matthies | 180/215 |
| 2008/0258415 A1 * | 10/2008 | Melcher | 280/124.103 |

FOREIGN PATENT DOCUMENTS

| | | |
|---|---|---|
| FR | 2121813 | 8/1972 |
| GB | 2155410 A | 9/1985 |
| JP | 01311907 | 12/1989 |
| JP | 03279010 | 12/1991 |
| JP | 05085133 | 6/1993 |
| JP | 06064438 | 3/1994 |
| WO | 9515865 | 6/1995 |
| WO | 9637375 | 11/1996 |
| WO | 9849023 | 11/1998 |
| WO | 0038939 | 7/2000 |
| WO | 02058949 A1 | 8/2002 |
| WO | 2004098916 A1 | 11/2004 |
| WO | 2005051712 A2 | 6/2005 |

* cited by examiner

MOTOR VEHICLE WITH LEANING SYSTEM CONTROLLED BY LOAD SENSOR AND METHOD THEREFOR

CLAIM TO DOMESTIC PRIORITY

The present non-provisional patent application claims the benefit of priority of provisional application Ser. No. 60/794,055 entitled "Prototype of Lean Vehicle with Details of Force Sensor in Steering," filed Apr. 20, 2006.

FIELD OF THE INVENTION

The present invention relates in general to motor vehicles and, more specifically, to a motor vehicle with a load sensor for controlling leaning attitude of the vehicle.

Many vehicles such as motorcycles are capable of leaning to one side or the other side. Most motorcycles have two wheels so leaning the vehicle is natural. The act of leaning the motorcycle in one direction while the motorcycle is traveling forward pulls the front steering in the same direction as the lean. Leaning also increases the contact area of the tire on the road surface and better positions the center of gravity on the line of force applied to the road surface by the motorcycle and rider.

Another type of leaning vehicle is disclosed in U.S. Pat. Nos. 6,805,362 and 7,131,650. These patents show a four-wheel vehicle having a frame and suspension with automatic lean and alignment. The lean is determined by force sensors, speed, and angle of turn and effected by actuators in the suspension, which enables the system to automatically select the amount of lean based on the speed and angle of turn of the vehicle. Alternatively, the angle of lean can be determined and automatically adjusted based on feedback from one or more force sensors that are positioned to detect a distribution of gravitational and centrifugal forces.

The suspension uses an arm assembly for each wheel connected to the frame and a mechanical feedback mechanism forming an interconnection between the frame and the suspension. Each arm assembly has a lower arm, an upper control arm, and an actuator mounted to the lower arm and pivotally connected to the upper control arm. The arm assemblies generally form parallelograms and are actuated in concert to remain generally parallel to each other through a range of angles to adjust the lean of the vehicle. The arm assemblies are also actuated independently of each other to accommodate variations in the contour.

SUMMARY OF THE INVENTION

A need exists to improve the leaning control system with load sensors acting in response to changes of pressure on the steering assembly.

In one embodiment, the present invention is a vehicle with a lean control comprising a frame and a steering assembly mounted to the frame. An arm assembly is mounted to the frame. The arm assembly has an upper control arm, a lower control arm, and an actuator arm. The upper and lower control arms are connected to the frame. The actuator is mounted to the lower arm and pivotally connected to the upper control arm. A pair of first and second shock absorbers is mounted between the frame and the actuator arm on opposite sides of the frame. Each shock absorber has a fluid-filled chamber and floating piston. A load sensor is mounted to the steering assembly for detecting changes of pressure on the steering assembly. The load sensor has a housing, a pressure sensing area disposed in the housing to sense the pressure through the steering assembly, and an electrical contact providing an electrical signal in response to the pressure sensing area. An electronic control unit is coupled to the electrical contact of the load sensor. A motor and pump assembly is responsive to the electronic control unit for transferring fluid between the chambers of the first and second shock absorbers.

In another embodiment, the present invention is a vehicle comprising a frame and a steering assembly mounted to the frame. An arm assembly is connected to the frame. A pair of first and second shock absorbers is mounted between the frame and the arm assembly on opposite sides of the frame. Each shock absorber has a fluid-filled chamber and floating piston. A load sensor is mounted to the steering assembly for detecting changes of pressure on the steering assembly. The load sensor has a housing, a pressure sensing area disposed in the housing, and an electrical contact providing an electrical signal in response to the pressure sensing area. An electronic control unit is coupled to the electrical contact of the load sensor. A motor and pump assembly is responsive to the electronic control unit for transferring fluid between the chambers of the first and second shock absorbers.

In another embodiment, the present invention is a vehicle comprising a frame and a steering assembly mounted to the frame. An arm assembly is connected to the frame. A pair of first and second shock absorbers is mounted between the frame and the arm assembly on opposite sides of the frame. Each shock absorber has a fluid-filled chamber and floating piston. A load sensor is responsive to changes of pressure on the steering assembly. An electronic control unit is coupled to the electrical contact of the load sensor. A motor and pump assembly is responsive to the electronic control unit for transferring fluid between the chambers of the first and second shock absorbers.

In another embodiment, the present invention is a method of making a vehicle having lean control comprising the steps of providing a frame, mounting a steering assembly to the frame, connecting an arm assembly to the frame, mounting first and second shock absorbers between the frame and the arm assembly on opposite sides of the frame, the shock absorber including a fluid-filled chamber and floating piston, mounting a load sensor to the steering assembly for detecting changes of pressure on the steering assembly, the load sensor having a housing, a pressure sensing area disposed in the housing, and an electrical contact providing an electrical signal in response to the pressure sensing area, providing an electronic control unit coupled to the electrical contact of the load sensor, and providing a motor and pump assembly responsive to the electronic control unit for transferring fluid between the chambers of the first and second shock absorbers.

DETAILED DESCRIPTION OF EMBODIMENTS OF THE INVENTION

The present invention is described in one or more embodiments in the following description with reference to the Figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Figure 1:
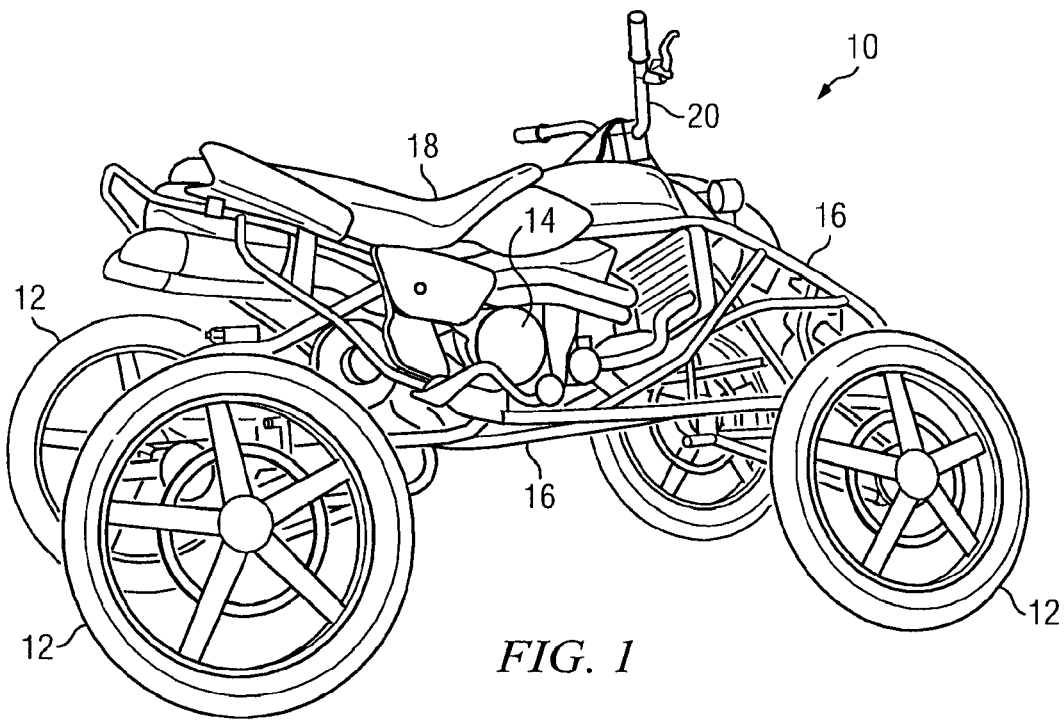
FIG. 1 illustrates a vehicle with frame and suspension to enhance leaning of the vehicle.

A motor vehicle 10 is shown in FIG. 1 supported on a frame and suspension assembly. Vehicle 10 has four wheels 12 and motor 14 mounted on frame 16. The rider sits on seat 18 and steers the vehicle with handlebars or steering assembly 20. Vehicle 10 has a unique leaning mechanism for turning while maintaining stability. The leaning system uses a load sensor to control floating piston shock absorbers by transferring fluid between the shocks in response to changes of pressure applied to the handlebars as detected by the load sensor.

Figure 2:
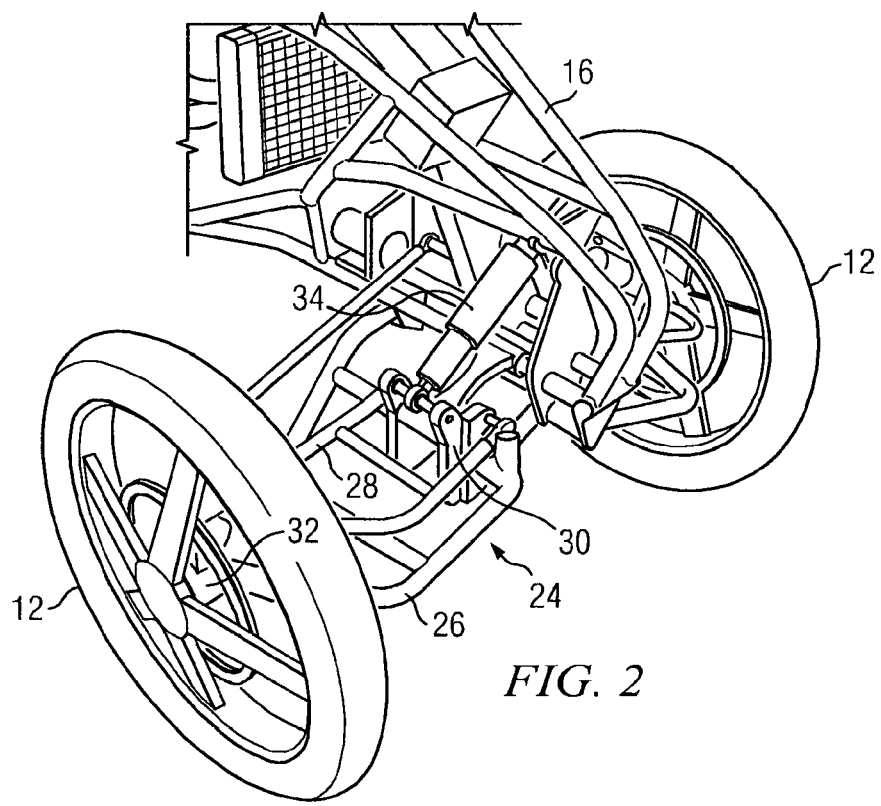
FIG. 2 illustrates a front portion of the frame and suspension.

Further detail of the vehicle's front frame and suspension assembly is shown in FIG. 2. Arm assembly 24 is mounted on either side of the frame and suspension assembly and independently and pivotally connected to frame 16. Each arm assembly 24 has a lower arm 26, upper control arm 28, actuator 30 connecting inboard ends of lower arm 26 and upper control arm 28, and a hub assembly 32 connecting the outboard ends of lower arm 26 and upper control arm 28. Each of the lower arm 26 and upper control arm 28, actuator 30, and hub assembly 32 are pivotally connected to each other. Further detail of the arm assemblies is disclosed in U.S. Pat. No. 6,805,362, entitled "Vehicle Lean and Alignment Control System," and U.S. Pat. No. 7,131,650, entitled "Vehicle Lean and Alignment Control System," which are fully incorporated herein by reference. In the present embodiment, the movement of actuator 30 is controlled by shock absorber 34 operating in response to the load sensors.

Figure 3:
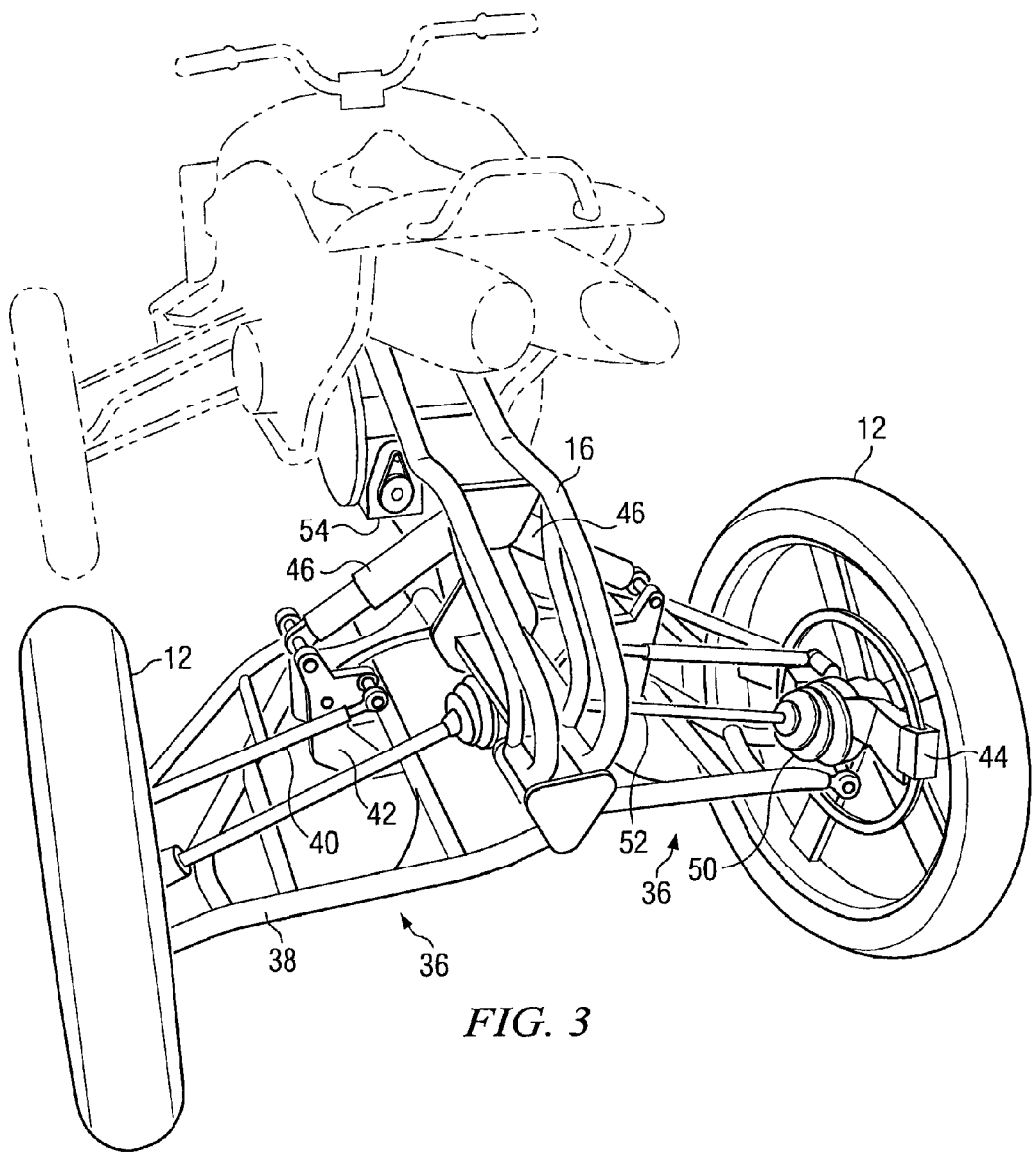
FIG. 3 illustrates a rear portion of the frame and suspension.

The rear frame and suspension assembly is shown in FIG. 3. Arm assembly 36 is located on either side of frame and suspension assembly and independently and pivotally connected to frame 16. Each arm assembly 36 has a lower arm 38, upper control arm 40, actuator 42 connecting inboard ends of lower arm 38 and upper control arm 40, and a hub assembly 44 connecting the outboard ends of lower arm 38 and upper control arm 40. Each of the lower arm 38 and upper control arm 40, actuator 42, and hub assembly 44 are pivotally connected to each other. In the present embodiment, the movement of actuator 42 is controlled by shock absorber 46 in response to the load sensor. The arm assemblies allow the frame to lean through a range of angles relative to a plane that is upright and substantially perpendicular to a level road surface.

FIG. 3 further illustrates the assembly linkage to drive hub bearing carriers 50 by drive shaft 52. Because the suspension system substantially forms a parallelogram during operation, the in and out longitudinal movement of the drive shaft is taken up within the spline or CV joint in the hub bearing carrier. The separation between the drive shafts is kept small as possible to maintain the suspension system as the parallelogram form. The chain or belt-driven jack shaft 54 is located along a center portion of frame 16.

Figure 4:
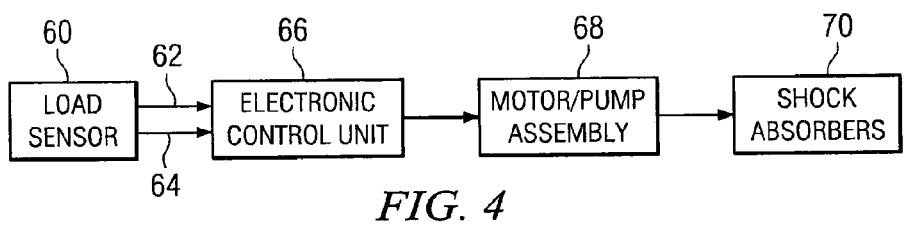
FIG. 4 is a block diagram of the load sensor control system.

The control system for the shock absorbers is shown in FIG. 4. Load sensor 60 senses changes of pressure applied to the handlebars attributed to the rider's balance or lean. Load sensor 60 sends an electric signal via conductor 62 or conductor 64 to electronic control unit (ECU) 66. The amount of lean is determined by the force sensors, speed, and angle of turn. If the rider leans to the right, then load sensor 60 detects the change in pressure and sends a first electrical signal by way of conductor 62 to ECU 66. If the rider leans to the left, then load sensor 60 detects the opposite change in pressure and sends a second electrical signal by way of conductor 64 to ECU 66.

Figure 5A:
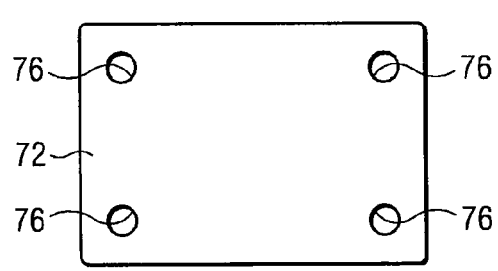
FIGS. 5a-5d illustrate the metering block of the load sensor.
Figure 5B:
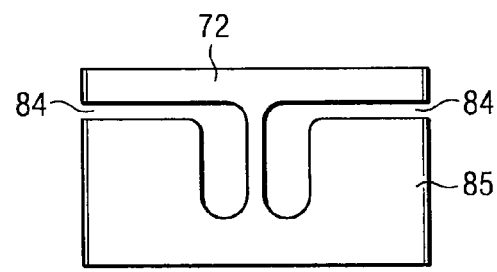
Figure 5C:
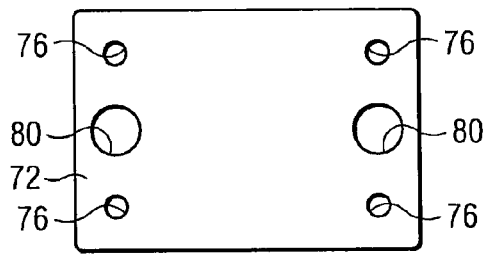
Figure 5D:
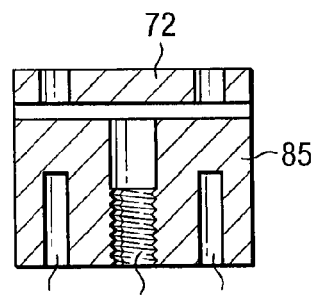
Figure 6:
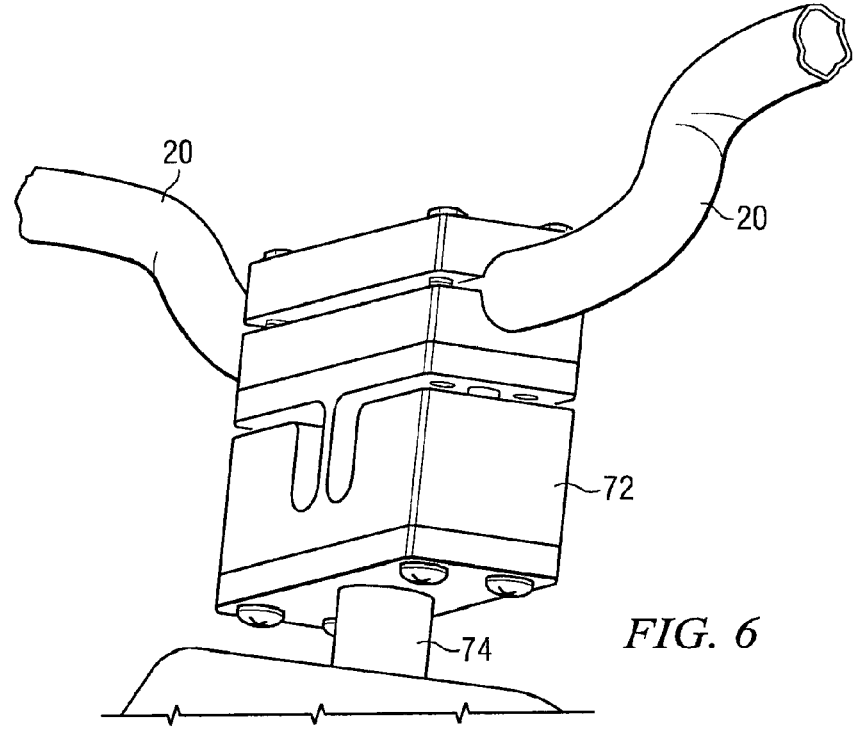
FIG. 6 illustrates the metering block mounted between the vehicle handlebars and steering shaft.

Further detail of load sensor 60 is shown in FIGS. 5a-5d. FIG. 5a is a top view of the top plate of titanium metering block 72 containing the force sensors; FIG. 5b is a side view of body 85 of the metering block; FIG. 5c is a bottom view of the bottom plate of the metering block; FIG. 5d is a cross-sectional view through body 85 of the metering block. Metering block 72 biases or distributes load to the left or right depending on changes of pressure or lean of the rider. Metering block 72 is mounted between steering shaft 74 and handlebars 20, as shown in FIG. 6. The load sensor 60 can be place in other locations to sense changes of pressure applied to the steering control. The metering block is held together with bolts inserted through cavities 76.

Figure 7:
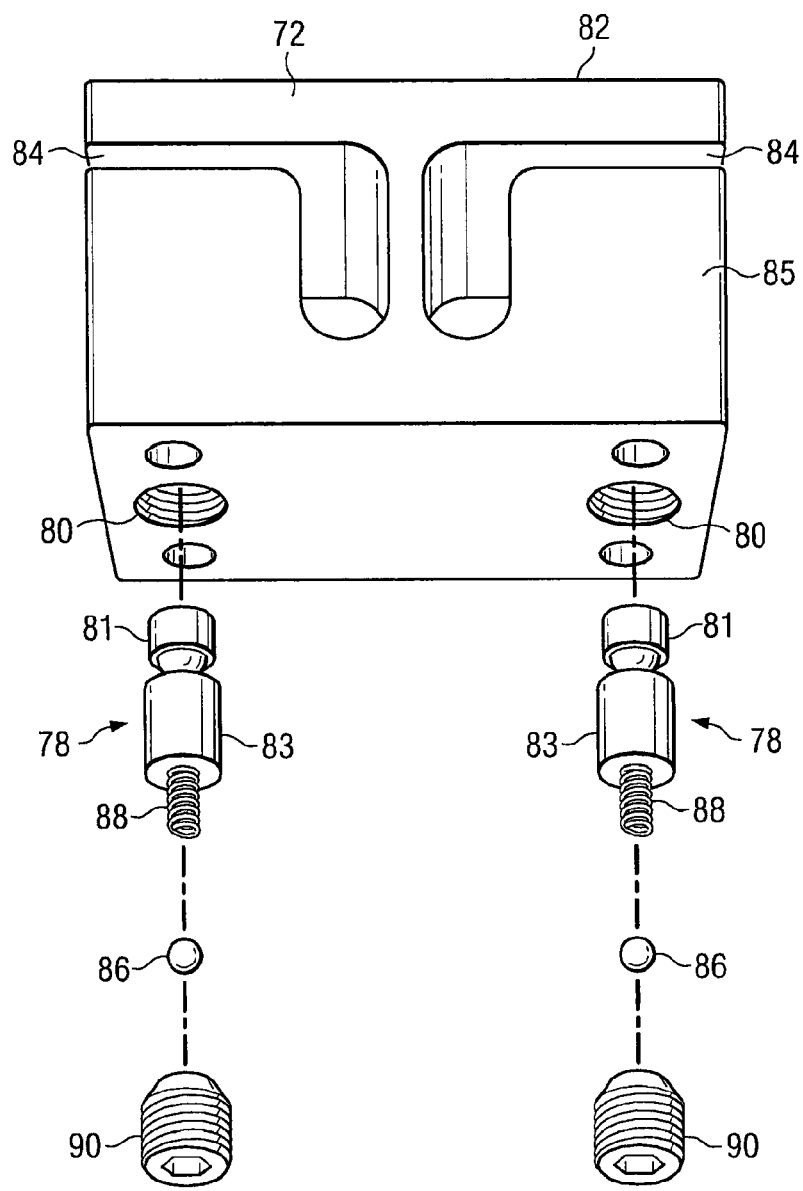
FIG. 7 is an exploded view of the metering block.
Figure 8:
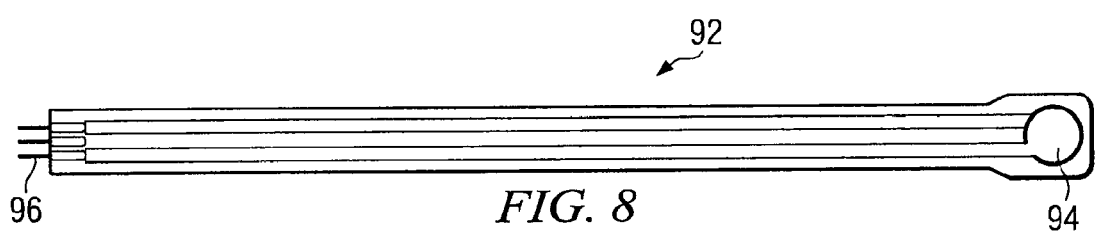
FIG. 8 illustrates the pressure sensing area of the load sensor and electric contacts.

FIG. 7 is an exploded view of the metering block. Plungers 78 are inserted into the bottom of the metering block via cavity 80. Plungers 80 have swivel heads 81 to lay flat in cavity 80. The swivel head 81 connects to shaft 83. Bearing 86 sets into spring 88. Bolt 90 holds plunger 78 into cavity 80. Thin-filament laminate force sensors or load cells 92 are positioned on either side of the metering block. The force sensor 92 is shown in FIG. 8. Pressure sensing area 94 is positioned above cavity 80 to align with plunger 78. Sensing area 94 converts pressure to an electric signal on conductors 96. The electric contact portion of force sensors 92 extends out from metering block 72 and connects to ECU 66. One load cell 92 is positioned on the left side of metering block 72 and one load cell 92 is positioned on the right side of metering block 72. Each load cell 92, which corresponds to conductors 62 and 64, represents the electrical output of the load cells 92. The sensor determines the amount of force applied by the rider through the handlebars as he or she leans the vehicle into a turn. In a neutral position, equal pressure is applied across the load cell. Any pressure applied to top surface 82 by the rider leaning on handlebars 20 compresses one side or the other side of gap 84 and asserts resistance on the load cell. The differential pressure is converted to a proportional electric signal which is routed to ECU 66.

Returning to FIG. 4, ECU 66 controls motor/pump assembly 68. In one embodiment, the motor/pump assembly 68 includes an electric motor controlled by ECU 66. The electric motor turns a gear which is chain or belt-driven to a hydraulic pump. In another embodiment, the pump is shaft-driven or direct drive by the motor or an integral unit. The vehicle may have one motor/pump assembly per wheel or one motor/pump assembly may drive multiple wheels. In yet another embodiment, the motor/pump assembly can have one motor and multiple pumps, e.g., one pump for each wheel. The motor/pump assembly 68 is connected to shock absorbers block 70 by fluid carrying lines containing non-compressible fluid The shock absorbers block 70 generally correspond to shock absorbers 34 and 46 on arm assemblies 24 and 36, respectively.

Figure 9:
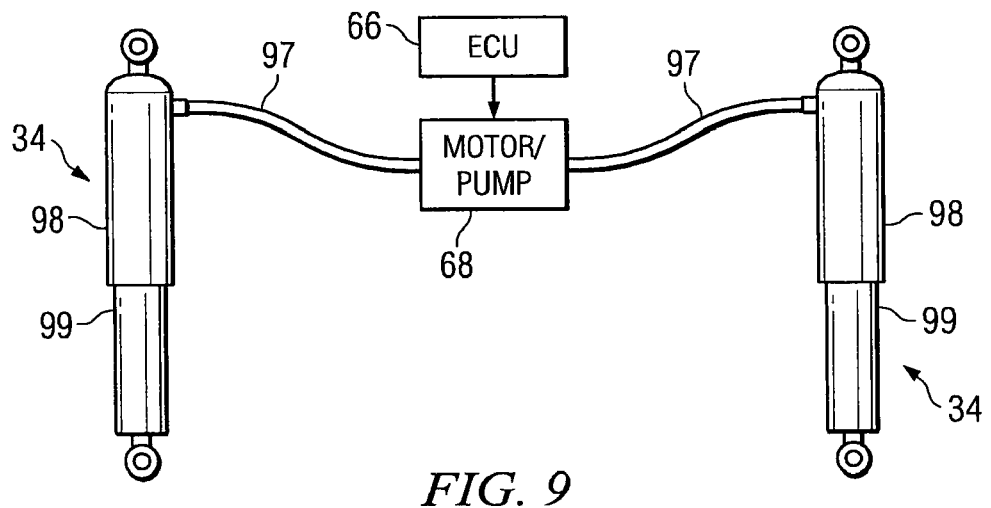
FIG. 9 illustrates the pump transferring fluid between shock absorbers.

Each shock absorber has a floating piston design with air reservoir in the lower portion of the shock and fluid-filled (oil-filled) upper chamber 98 as shown in FIG. 9. The floating piston 99 presses against the fluid to support the vehicle. The hydraulic pump 68 controls the volume of fluid in each shock absorber by transferring fluid back and forth between the shocks through lines 97. The motor/pump assembly can also use a valve to transfer fluid between the shock absorbers. The pump proportions the proper amount of pressure to the corresponding side of the vehicle by increasing and decreasing the volume of fluid in the chamber and pressure to the supporting shock to lean the vehicle to the left or right. That is, by changing the volume of fluid in the chamber of the shock, the attitude of the vehicle is controlled in any desired direction by increasing and decreasing the support for the floating piston.

As the rider leans to the right, load cell 92 on the right side of metering block 72 senses the change in pressure transmitted through the handlebars and sends an electrical signal to ECU 66. ECU 66 also determines the amount of force needed to turn the vehicle in response to the load cell sensor, taking into account the speed of the vehicle. In some embodiments, slower speeds will require more force to move the fluid between shock absorbers, and higher speeds will require less force to move the fluid between shock absorbers. In other embodiments, slower speeds may require less force to move the fluid between shock absorbers, and higher speeds may require more force to move the fluid between shock absorbers. Motor/pump assembly 68 responds to ECU 66 to adjust the right-side shock absorber 34 and the right-side shock absorber 46 to decrease in fluid volume and the left-side shock absorber 34 to increase in fluid volume as the shock absorber fluid is transferred from the right side to the left side of the vehicle. The shock absorbers allow the arm assembly to raise the right-side wheels 12 and lower the left-side wheels 12 relative to a horizontal plane, corresponding to a right turn of the vehicle with the right leaning action of the rider.

If the rider leans to the left, the load cell 92 on the left side of metering block 72 senses the change in pressure transmitted through the handlebars and sends an electrical signal to ECU 66. Motor/pump assembly 68 responds to ECU 66 to transfer fluid from the left-side shock absorbers to the right-side shock absorbers, i.e., the right-side shock absorber 34 and the right-side shock absorber 46 increase in fluid volume and the left-side shock absorber 34 and the left-side shock absorber 46 decrease in fluid volume as the shock absorber fluid is transferred from the left side to the right side of the vehicle. The shock absorbers allow the arm assembly to lower the right-side wheels 12 and raise the left-side wheels 12 relative to the horizontal plane, corresponding to a left turn of the vehicle with the left leaning action of the rider. As the rider returns to a neutral and balanced position, the differential pressure on the load cells goes to zero, which releases pressure in the shock absorbers and returns the vehicle to its original position.

As another feature of vehicle 10, ECU 66 is designed to stop the operation of the motor/pump assembly when the hand or foot brake is applied. If the rider is going into a turn and applies the foot or hand brake, the transfer of fluid between shock absorbers is interrupted to stop fluid transfer and maintain present volume of fluid in each shock absorber at the time of the foot or hand brake is applied, which stabilizes the vehicle.

Figure 10:
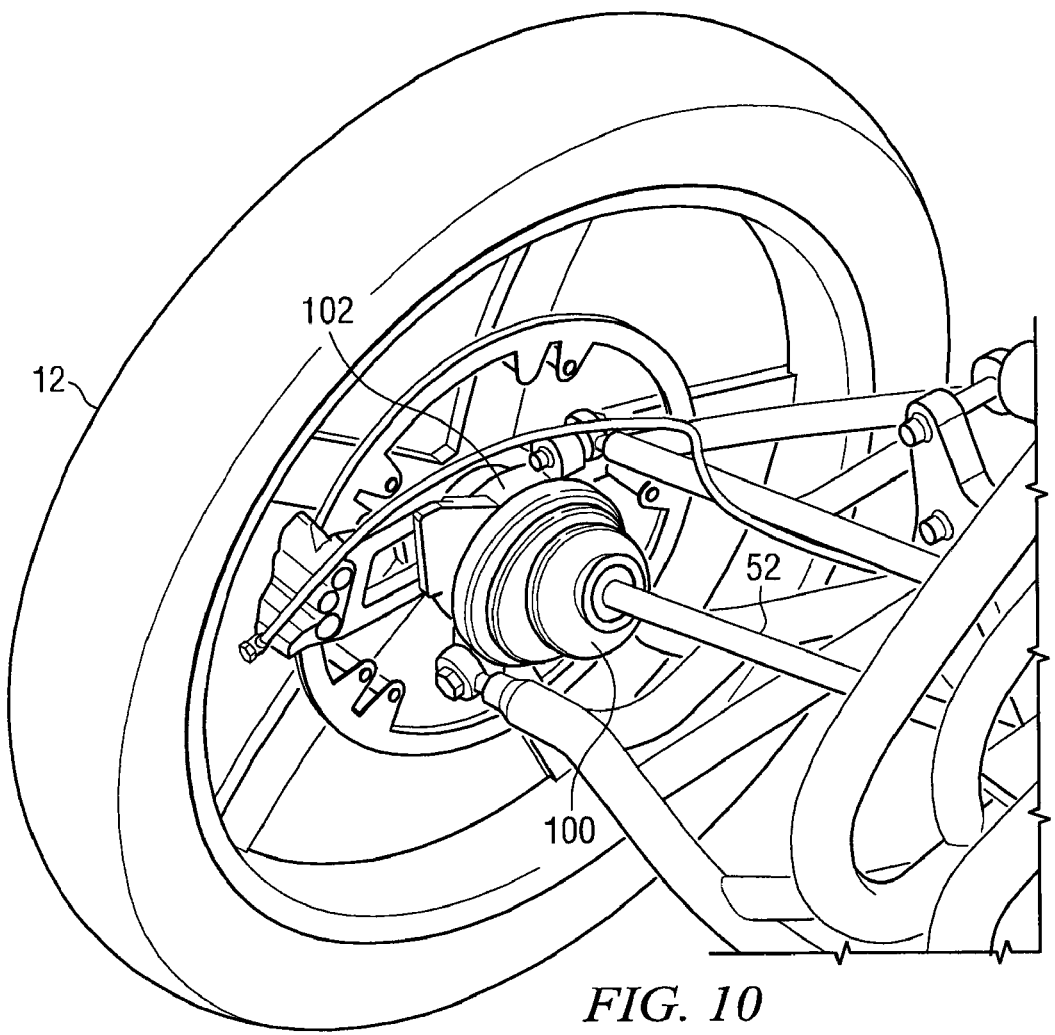
FIG. 10 illustrates the hub assembly with inboard rotating boot and outboard static boot.

Another feature of vehicle 10 is shown in FIG. 10 as inboard constant velocity (CV) boot 100 which rotates with drive shaft 52 and wheel 12. The outboard CV boot 102 is static, i.e., it does not rotate with the drive shaft and wheel. The outboard CV boot is clamped to the hub with a bearing, which rotates with the drift shaft. The static outboard CV boot provides for high turning angles without damaging the boot. All bearing surfaces are positioned around the outer diameter of the corresponding CV joint, which affords more angularity to the corresponding joints (inside and out) and allows the placement of the joints closer to the roll axis (center of the vehicle and center of the wheels).

Figure 11:
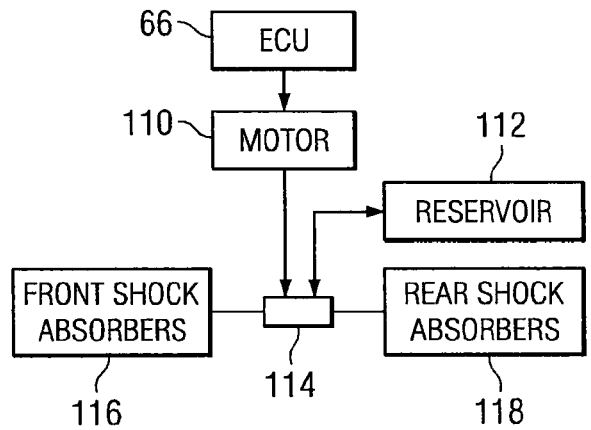
FIG. 11 is a block diagram of a fluid transfer system between front and rear shock absorbers through a reservoir.

FIG. 11 illustrates a fluid transfer system that exchanges fluid between the front and rear shock absorbers through a valve and reservoir. ECU 66 receives input from a gyro or other pitch attitude sensing device and controls motor/pump assembly 110 to transfer fluid between front shock absorbers 116 and rear shock absorbers 118 by way of valve 114. Reservoir 112 stores excess fluid. When the vehicle is moving uphill, fluid is transferred from the front shock absorbers 116 to the rear shock absorbers 118 to lower the front of the vehicle and raise the back of the vehicle to maintain the vehicle's pitch attitude. During braking, fluid is transferred from the rear shock absorbers 118 to the front shock absorbers 116 to raise the front of the vehicle and lower the back of the vehicle, again to maintain the vehicle's pitch attitude.

Figure 12:
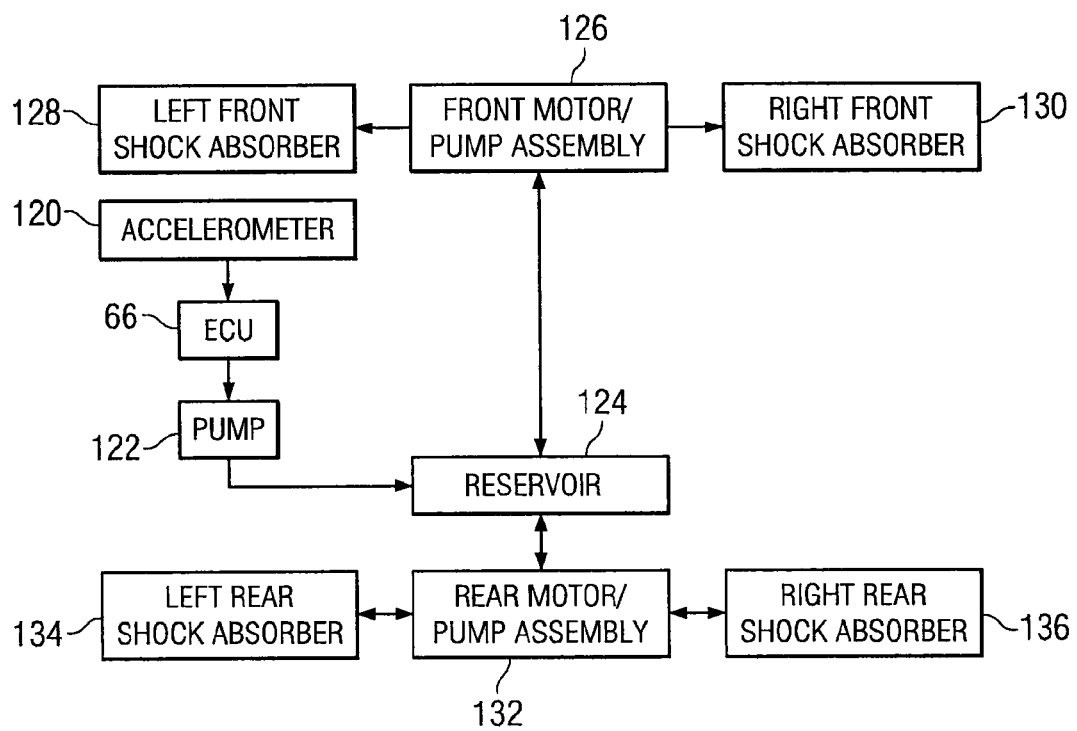
FIG. 12 is a block diagram of an alternate fluid transfer system between front and rear shock absorbers through a reservoir.

FIG. 12 illustrates another fluid transfer system that exchanges fluid between the front and rear shock absorbers through a reservoir. ECU 66 receives input from an accelerometer or other pitch attitude sensing device and controls pump 122 to transfer fluid from reservoir 124 to the front and rear motor/pump assemblies. When the vehicle is moving uphill, fluid is transferred from front motor/pump assembly 126 to reservoir 124, which reduces fluid in left and right front shock absorbers 128 and 130 to lower the front of the vehicle. At the same time, fluid is transferred from reservoir 124 to rear motor/pump assembly 132 to increase fluid in the left and right rear shock absorbers 134 and 136 to raise the back of the vehicle to maintain the vehicle's pitch attitude. During braking, fluid is transferred from reservoir 124 to front motor/pump assembly 126, which increases fluid in left and right front shock absorbers 128 and 130 to raise the front of the vehicle. At the same time, fluid is transferred from rear motor/pump assembly 132 to reservoir 124 to decrease fluid in the left and right rear shock absorbers 134 and 136 to lower the back of the vehicle, again to maintain the vehicle's pitch attitude.

While one or more embodiments of the present invention have been illustrated in detail, the skilled artisan will appreciate that modifications and adaptations to those embodiments may be made without departing from the scope of the present invention as set forth in the following claims.

What is claimed is:

1. A vehicle with a lean control, comprising:
  a frame;
  a steering assembly mounted to the frame;
  an arm assembly mounted to the frame, the arm assembly including an upper control arm, a lower control arm, and an actuator, the upper and lower control arms being connected to the frame, the actuator mounted to the lower arm and pivotally connected to the upper control arm;
  first and second shock absorbers mounted between the frame and the actuator on opposite sides of the frame, each shock absorber including a fluid-filled chamber and floating piston;

a load sensor mounted to the steering assembly for detecting changes of pressure on the steering assembly, the load sensor having a housing, a pressure sensing area disposed in the housing to sense the pressure through the steering assembly, and an electrical contact providing an electrical signal in response to the pressure sensing area;

an electronic control unit coupled to the electrical contact of the load sensor; and a motor and pump assembly responsive to the electronic control unit for transferring fluid between the chambers of the first and second shock absorbers.

2. The vehicle of claim 1, wherein the load sensor includes:
a body having a gap;
a first plate mounted to a top portion of the body over the gap;
a second plate mounted to a bottom portion of the body; and
a plunger disposed within a cavity in the body, wherein the pressure sensing area of the load sensor is vertically aligned with the plunger.

3. The vehicle of claim 2, wherein the plunger includes:
a shaft;
a pivoting head connected to an upper portion of the shaft;
a spring disposed below the shaft;
a bearing disposed below the spring; and
a nut for securing the plunger within the cavity of the body of the load sensor.

4. The vehicle of claim 2, wherein the load sensor detects pressure applied to the first plate.

5. The vehicle of claim 1, wherein the shock absorbers are mounted to the front and rear of the vehicle on opposite sides of the frame.

6. The vehicle of claim 1, further including:
a valve connected between the shock absorbers mounted to the front of the vehicle and the shock absorbers mounted to the rear of the vehicle for transferring fluid; and
a reservoir connected to the valve for storing the fluid.

7. The vehicle of claim 1, further including:
a drive shaft;
a hub connected to an outboard end of the drive shaft;
a rotating inner boot connected to the drive shaft on an inboard side of the hub; and
a static outer boot on an outboard side of the hub which remains stationary with respect to the frame.

* * * * *